United States Patent [19]
Grecksch et al.

[11] Patent Number: 5,205,396
[45] Date of Patent: Apr. 27, 1993

[54] CONVEYOR APPARATUS FOR MUTUALLY INDEPENDENT PALLETS THAT CARY BOBBINS OR BOBBIN TUBES

[75] Inventors: Hans Grecksch, Mönchengladbach; Rene Bucken, Grefrath, both of Fed. Rep. of Germany

[73] Assignee: W. Schlafhorst AG & Co., Monchen-Gladbach, Fed. Rep. of Germany

[21] Appl. No.: 716,066

[22] Filed: Jun. 17, 1991

[30] Foreign Application Priority Data

Jun. 15, 1990 [DE] Fed. Rep. of Germany ....... 4019100

[51] Int. Cl.$^5$ .............................................. B65G 49/00
[52] U.S. Cl. ............... 198/465.1; 198/690.2; 198/577; 198/832.1; 242/35.5 A
[58] Field of Search ............... 242/35.5 A; 198/465.1, 198/465.2, 690.2, 721, 783, 832.1, 832.2, 573, 577

[56] References Cited

U.S. PATENT DOCUMENTS 2,856,064 10/1958 De Windt .
3,351,429 9/1968 Garvey ............................ 198/690.2
3,650,376 3/1972 Burgis et al. ...................... 198/721
4,875,572 10/1989 Kiriake .
5,056,725 10/1991 Wirtz et al. .................... 242/35.5 A
5,078,329 1/1992 Grecksch et al. ............. 242/35.5 A

FOREIGN PATENT DOCUMENTS 3235442 4/1983 Fed. Rep. of Germany .
3812342 10/1989 Fed. Rep. of Germany .
3813331 11/1989 Fed. Rep. of Germany .
52-25139 2/1977 Japan .

Primary Examiner—Joseph E. Valenza
Attorney, Agent, or Firm—Herbert L. Lerner; Laurence A. Greenberg

[57] ABSTRACT

A conveyor apparatus has mutually independent pallets carrying bobbins or bobbin tubes and having base plates. A moving surface, such as a surface of a conveyor belt, imparts a slaving force to the base plates standing on the moving surface and slaves the base plates along a conveyor route by friction. A device acts upon unmoving pallets for briefly varying the slaving force of the moving surface.

12 Claims, 2 Drawing Sheets

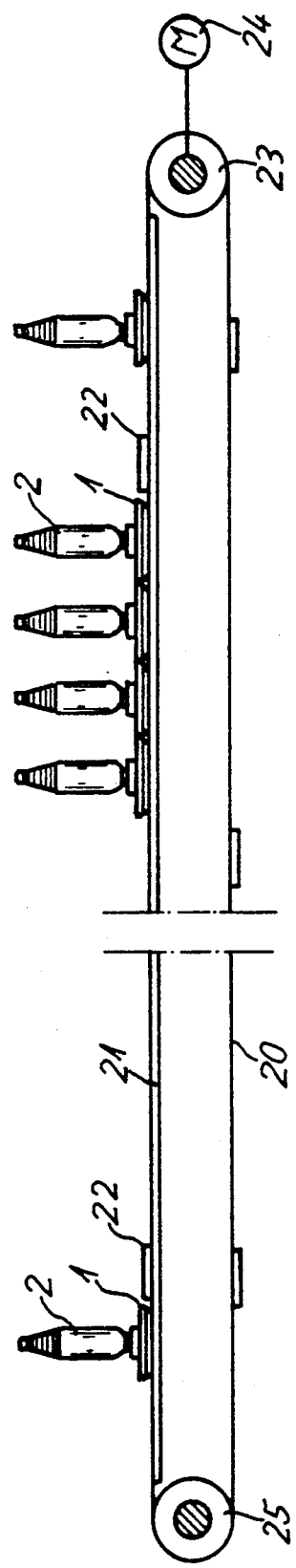
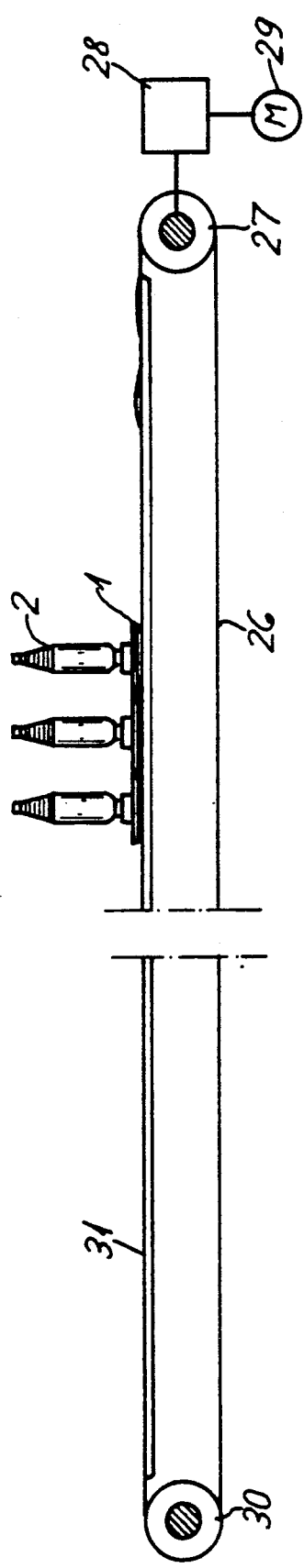

CONVEYOR APPARATUS FOR MUTUALLY INDEPENDENT PALLETS THAT CARY BOBBINS OR BOBBIN TUBES

The invention relates to a conveyor apparatus for mutually independent pallets carrying bobbins or bobbin tubes and having base plates, a moving surface, such as a surface of a conveyor belt, for slaving the base plates standing on the moving surface along the conveyor route by friction locking.

Transporting bobbins and bobbin tubes by means of mutually independent individual carriers that have a base plate and a mandrel onto which the bobbins and bobbin tubes are slipped, is known from a number of publications, such as Japanese Published Application No. 52-25 139 or German Published, Non-Prosecuted Application DE-OS 32 35 442. In such devices, the individual carriers are slaved by friction locking between surfaces, such as conveyor belts or rollers, that are moved in the conveying direction. In order to assure adherence to the transport route, C-shaped rails are disposed on both sides of the conveying route, as a rule forming a guide slit in which the individual carriers are guided on a pedestal-like structure that is disposed between the base plate and the mounting mandrel.

Such a conveyor system is very well suited for automation. However, the transport route thereof can become completely blocked by a backup or jam of the pallets, which are intrinsically independent of one another. Within a short time, this can result in inadequate delivery, for instance of cops to a bobbin winding machine or of empty tubes to a spinning machine. Such backups or jams can be caused by dirt inside the conveyor path, by trailing yarns, or by a collision of pallets from various transport paths where the paths converge.

It is accordingly an object of the invention to provide a conveyor apparatus for mutually independent pallets that carry bobbins or bobbin tubes, which overcomes the hereinafore-mentioned disadvantages of the heretofore-known devices of this general type and which does so in such a way that any backups or jams that arise are rapidly broken up again.

With the foregoing and other objects in view there is provided, in accordance with the invention, in a conveyor system for mutually independent pallets carrying bobbins or bobbin tubes and having base plates, a conveyor apparatus, comprising a conveyor route, a moving surface, such as a surface of a conveyor belt, for imparting a slaving force to the base plates standing on the moving surface and for slaving the base plates along the conveyor route by friction locking, and means acting upon unmoving pallets for briefly varying the slaving force of the moving surface.

The brief variation in the slaving force of the moving surface conveying the pallets superimposes a pulsed motion component upon the uniform motion component in the conveyor apparatus. The shear force that acts upon the pallets and overcomes any obstacles is thereby increased, for instance briefly.

In accordance with another feature of the invention, the slaving force varying means are spaced-apart uneven features protruding from the moving surface.

In accordance with a further feature of the invention, at least some of the uneven features are formed of elastic material.

In accordance with an added feature of the invention, the base plates have lower surfaces with beveled peripheries.

In accordance with an additional feature of the invention, the moving surface has a drive imparting a uniform motion to the moving surface, and the slaving force varying means are in the form of a control device acting upon the drive for superimposing a pulse-like motion upon the uniform motion of the moving surface.

In accordance with yet another feature of the invention, the control device is a periodically intervening brake.

In accordance with yet a further feature of the invention, the drive has a drive motor, and the brake acts upon the drive motor.

In accordance with a concomitant feature of the invention, the drive has a drive motor, and the control device is a control circuit acting upon the drive motor for briefly reversing rotational direction of the drive motor.

Varying a regular surface, for example of conveyor belts, with uneven features, is a very simple but effective provision. While these features do not act upon pallets that are slaved by the conveyor belt, or in other words execute no relative motion to the moving surface, in unmoving pallets they generate wave-shaped pulses. The intensity of these pulses may be varied by the structure, and above all by the height of the uneven features, or by their elasticity as well.

A similar effect is attained by means of a non-uniform motion of the surface, for example of the conveyor belt. If there are a plurality of backed-up pallets which may possibly be advanced by a certain distance opposite to the normal conveying direction by a reversal of the direction of motion, the obstacle is counteracted by the pulse-like shear force of this line of pallets.

Other features which are considered as characteristic for the invention are set forth in the appended claims.

Although the invention is illustrated and described herein as embodied in a conveyor apparatus for mutually independent pallets that carry bobbins or bobbin tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 2 is a simplified side-elevational view of a conveyor belt with spaced apart uneven features; and FIG. 3 is a simplified side-elevational view of a conveyor belt with control means for a drive mechanism thereof.

Figure 1:
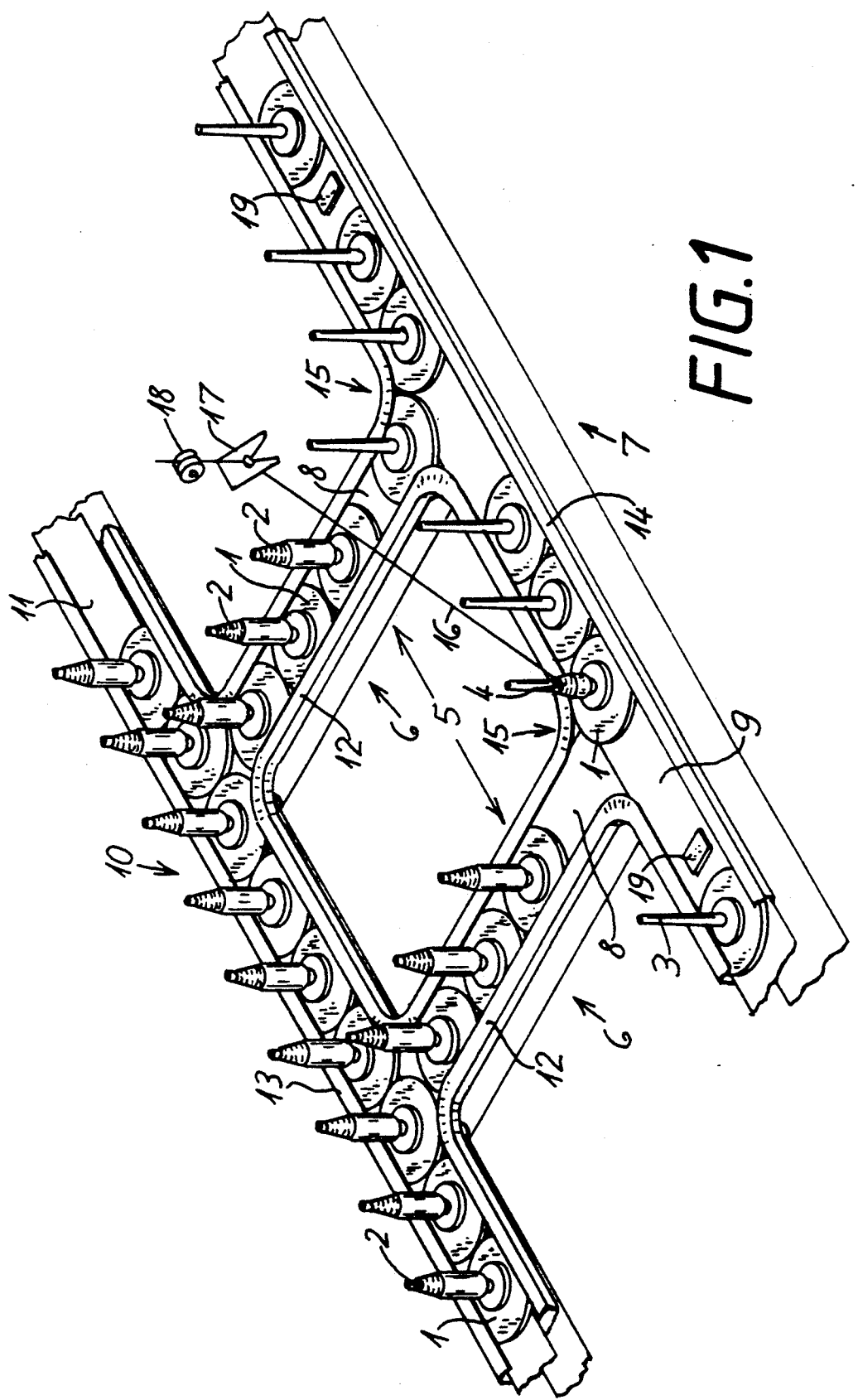
FIG. 1 is a fragmentary, diagrammatic, perspective view of a conveyor system with pallets, in which system a conveyor belt has uneven features being spaced apart from one another.

Referring now to the figures of the drawing in detail and first, particularly, to FIG. 1 thereof, there is seen a portion of a conveyor system for an automatic bobbin winding machine. Pallets 1 with cops 2 mounted thereon are moved by a reversing conveyor belt 11 along a distributor path 10 past transverse conveyor paths 6 leading to winding stations. During unwinding, the cops remain in an unwinding position 5 on the pallets 1. Once the unwinding process has ended, the pallets 1, with empty tubes 3 or remaining cops 4, are released by the applicable winding station. Through the use of a conveyor belt 8 moving in the transverse conveyor path 6 toward a tube return path 7, such pallets are then transported to the tube return path 7 and taken over by a conveyor belt 9. The distributor path 10, the transverse conveyor paths 6 and the tube return path 7 form a conveyor route and are limited on both sides of the applicable conveyor belts by guide rails 12-14. These guide rails serve the purpose of lateral guidance of the pallets 1 in the transport direction intended for them. If the guide rails are constructed with a C shape, the inner lower surfaces thereof simultaneously serve as bearing surfaces for the conveyor belts, while the inner upper surfaces thereof serve to secure the pallets 1 against tipping.

Once a pallet 1 has been released by a winding station, the pallets 1 parked in a waiting position on the transverse conveyor path 6 are likewise conveyed toward the tube return path 7. However, since the pallet following the released pallet 1 is restrained in the unwinding position 5, conveyance is effected by only the width of one base plate of one pallet 1. Since the conveyor belts 8 of the transverse conveyor paths 6 protrude into the range of the distributor path 10, the next pallet I traveling past is engaged by the conveyor belt 8 and pulled into the transverse conveyor path 6. The edge of the base plate of this pallet I which is oriented toward the distributor path 10, then again forms a bearing surface for further pallets I transported along the distributor path 10. For example, the conveyor belt 11 may be moved by means of a non-illustrated control system during predetermined periods of time, in one conveying direction, which is reversed again once the time interval has elapsed. As a result, the pallets 1 are moved continuously past the transverse conveyor paths 6.

The conveyor belt 9 of the tube return path 7 has uneven features in the form of slaving, driving or pushing elements 19 that are spaced apart at relatively long intervals, which develop a pulse-like feed force upon unmoving pallets 1. The salving elements 19 provide means acting upon unmoving pallets 1 for briefly varying the slaving force of a moving surface defined by the conveyor belt 9. The base plates of the pallets stand on the moving surface and are slaved along the conveyor route by friction.

FIG. 1 shows the two most frequent causes for a backup or jam. For example, a yarn or thread 16 may extend from a remaining cop 4 as far as a yarn cleaner 17 or a yarn brake 18. In this way, a yarn end may also become caught at other components of the winding station, along a delivery path for a cop preparation apparatus, or at other components which are disposed along the conveyor route of the pallets. It is thus apparent that the means according to the invention may be provided at the most varied points in a conveyor system.

A second reason for the development of a backup or jam can be seen at a converging point 15. This case arises if the shear forces of the transverse conveyor belt 6 and the tube return conveyor belt 9 produce a resultant force which is directed at right angles to the curved edge of the guide rail 12, upon two pallets 1 arriving at the converging point 15. The breakup of such a backup or jam is additionally promoted by the fact that a slaving element 19 pushes the pallet 1 waiting on the transverse conveyor belt 8 back somewhat, thereby increasing the shear force component for the unmoving pallet on the tube return belt 9, which is possibly additionally reinforced by backed-up pallets behind it. Then the pallet 1 waiting on the transverse conveyor belt 8 cannot enter the tube return path 7, as it moves past the backed-up pallets 1 on the tube return belt 9, until a gap appears between the pallets. In no case, however, is this period of time long enough to last until the next pallet 1 will already have been released by the winding station disposed along the same transverse conveyor path 6.

Besides the above two main causes for backups or jams, soiling of the conveyor routes can naturally also be mentioned. At these points, according to the invention, there is once again a change in the slaving force that acts upon the blocked pallets 1. The result is that the accumulations of dirt are broken up.

FIG. 2 shows a side view of a conveyor belt 20, which is driven by a motor 24 and a drive roller 23 and is deflected by a deflecting roller 25. This conveyor belt 20 likewise has slaving elements 22. The salving elements 22 provide means acting upon unmoving pallets 1 for briefly varying the slaving force of a moving surface defined by the conveyor belt 20. The conveyor belt 20 is a delivery belt, which carries pallets 1 with cops 2. It can be seen that the base plates have lower surfaces with beveled peripheries.

As can also be seen from this side view, the slaving elements 22 protrude even farther beyond the surface of the conveyor belt 20. At least some of these slaving elements are formed of elastic material. Elastic cushioning of a slaving element that itself is formed of rigid material would also be possible. Both rubber and a metal spring are possible examples of an elastic material. The decisive factor is that the elastic material is constructed in such a way that the applicable slaving element can first absorb a relatively major force before the elastic material yields. In this way a situation in which a form locking creates suddenly excessive forces can be prevented, without lessening the effectiveness of the slaving elements. A form-locking connection is one which connects two elements together due to the shape of the elements themselves, as opposed to a force-locking connection, which locks the elements together by force external to the elements.

FIG. 3 shows a variant of the invention, in which a conveyor belt 26 is driven by a drive roller 27 and deflected by a deflecting roller 30. The driving force of a motor 29 is transmitted to the drive roller 27 through a control device 28. The control device 28 may be a gear, for example, which has a periodically intervening brake, so that in this way a pulsed motion can be superimposed on the uniform motion. However, the brake can also act directly upon the drive motor 29. The possibility also exists for the control device 28 to briefly vary the rpm of the motor 29 through a current inverter circuit, or may even to change its direction of rotation. The possibility furthermore exists for the control device 28 to include a gear that uses suitable coupling elements to vary or reverse the rotational motion generated uniformly by the motor. The control device 28 is a salving element which provides means acting upon unmoving pallets 1 for briefly varying the slaving force of a moving surface defined by the conveyor belt 26.

FIGS. 2 and 3 also show support surfaces 21 and 31 for the conveyor belts 20 and 26. Guide rails have not been shown in these simplified side views.

We claim:

1. In a conveyor system for mutually independent pallets carrying bobbins or bobbin tubes, a conveyor apparatus, comprising a conveyor route, mutually independent pallets for carrying bobbins or bobbin tubes and having base plates, a moving surface for imparting a slaving force to said base plates standing on said moving surface and for slaving said base plates in a general conveying direction along said conveyor route by friction for a given first period of time, and means associated with said moving surface acting upon unmoving pallets for temporarily varying said slaving force of said moving surface for a given second period of time, said second period of time being substantially shorter than said first period of time, said slaving force varying means being spaced-apart uneven features protruding from said moving surface, and the base plates having lower surfaces with beveled peripheries.

2. The conveyor apparatus according to claim 1, wherein said moving surface is a surface of a conveyor belt.

3. The conveyor apparatus according to claim 1, wherein said uneven features are at least partly formed of elastic material.

4. In a conveyor system for mutually independent pallets carrying bobbins or bobbin tubes, a conveyor apparatus, comprising a conveyor route, mutually independent pallets for carrying bobbins or bobbin tubes and having base plates, a moving surface for imparting a slaving force to said base plates standing on said moving surface and for slaving said base plates in a general conveying direction along said conveyor route by friction for a given first period of time, and means associated with said moving surface acting upon unmoving pallets for temporarily varying said slaving force of said moving surface for a given second period of time, said second period of time being substantially shorter than said first period of time, wherein said moving surface has a drive imparting a uniform motion to said moving surface, and said slaving force varying means are in the form of a control device acting upon said drive for superimposing a pulse-like motion upon said uniform motion of said moving surface.

5. The conveyor apparatus according to claim 4, wherein said control device is a periodically intervening brake.

6. The conveyor apparatus according to claim 5, wherein said drive has a drive motor, and said brake acts upon said drive motor.

7. The conveyor apparatus according to claim 4, wherein said drive has a drive motor, and said control device is a control circuit acting upon said drive motor for briefly reversing rotational direction of said drive motor.

8. In a conveyor system for mutually independent pallets carrying bobbins or bobbin tubes, a conveyor apparatus, comprising a conveyor route, mutually independent pallets for carrying bobbins or bobbin tubes and having base plates, a moving surface for imparting a slaving force of a given magnitude to said base plates standing on said moving surface and for slaving said base plates generally in one direction along said conveyor route by friction for a given first period of time, and means operatively associated with said moving surface for temporarily varying the magnitude of said slaving force of said moving surface for a given second period of time for shiftingly displacing said pallets relative to said moving surface, said second period of time being substantially shorter than said first period of time, wherein said moving surface has a drive imparting a uniform motion to said moving surface, and said slaving force varying means are in the form of a control device acting upon said drive for superimposing a pulse-like motion upon said uniform motion of said moving surface.

9. The conveyor apparatus according to claim 8, wherein said moving surface is a surface of a conveyor belt.

10. The conveyor apparatus according to claim 8, wherein said control device is a periodically intervening brake.

11. The conveyor apparatus according to claim 10, wherein said drive has a drive motor, and said brake acts upon said drive motor.

12. In a conveyor system for mutually independent pallets carrying bobbins or bobbin tubes, a conveyor apparatus, comprising a conveyor route, mutually independent pallets for carrying bobbins or bobbin tubes and having base plates, a moving surface for imparting a slaving force of a given magnitude to said base plates standing on said moving surface and for slaving said base plates generally in one direction along said conveyor route by friction for a given first period of time, and means operatively associated with said moving surface for temporarily varying the magnitude of said slaving force of said moving surface for a given second period of time for shiftingly displacing said pallets relative to said moving surface, said second period of time being substantially shorter than said first period of time, said force varying means including means for temporarily reversing a direction of travel of said moving surface during said given second period of time and immediately causing said moving surface to again move in the direction of travel.

* * * * *